(12) United States Patent
Higuchi et al.

(10) Patent No.: US 11,078,980 B2
(45) Date of Patent: Aug. 3, 2021

(54) VIBRATION SUPPRESSION DEVICE, MACHINE TOOL, AND VIBRATION SUPPRESSION METHOD

(71) Applicant: DMG MORI Co., Ltd., Yamatokoriyama (JP)

(72) Inventors: Yosuke Higuchi, Yamatokoriyama (JP); Yasuhiro Imabeppu, Yamatokoriyama (JP); Tomohiro Tsuzuki, Yamatokoriyama (JP); Naruhiro Irino, Yamatokoriyama (JP); Yutaka Ido, Yamatokoriyama (JP)

(73) Assignee: DMG MORI Co., Ltd., Nara (JP)

( * ) Notice: Subject to any disclaimer, the term of this patent is extended or adjusted under 35 U.S.C. 154(b) by 176 days.

(21) Appl. No.: 16/471,340

(22) PCT Filed: Dec. 21, 2017

(86) PCT No.: PCT/JP2017/045890
§ 371 (c)(1),
(2) Date: Jun. 19, 2019

(87) PCT Pub. No.: WO2018/123794
PCT Pub. Date: Jul. 5, 2018

(65) Prior Publication Data
US 2020/0088259 A1 Mar. 19, 2020

(30) Foreign Application Priority Data
Dec. 26, 2016 (JP) .............................. JP2016-251401

(51) Int. Cl.
*F16F 7/104* (2006.01)
*F16F 7/108* (2006.01)
(Continued)

(52) U.S. Cl.
CPC ................ *F16F 7/108* (2013.01); *B23Q 1/01* (2013.01); *B23Q 11/0032* (2013.01); *F16F 15/02* (2013.01)

(58) Field of Classification Search
CPC .. F16F 7/104; F16F 7/108; F16F 15/02; F16F 7/116; B23Q 1/01; B23Q 11/0032
(Continued)

(56) References Cited

U.S. PATENT DOCUMENTS

| | | | | |
|---|---|---|---|---|
| 2,271,935 A | * | 2/1942 | Buchanan | ................ H02G 7/14 174/42 |
| 3,314,503 A | * | 4/1967 | Neubert | .................. F16F 15/10 188/379 |

(Continued)

FOREIGN PATENT DOCUMENTS

| | | |
|---|---|---|
| CN | 104786093 A | 7/2015 |
| CN | 103567809 B | 6/2016 |

(Continued)

*Primary Examiner* — Thomas W Irvin
(74) *Attorney, Agent, or Firm* — The Webb Law Firm (57) ABSTRACT

There is provided a vibration suppression device, a machine tool including the device and a vibration suppression method using the device. The vibration suppression device includes a flexible member having a first position F fixed to the structure to be a fixed end of a cantilever and a second position on a free end side; and a weight attached to the flexible member in the second position. The vibration suppression device has an adjustment mechanism for changing a distance between the first position and the second position. Accordingly, it can effectively suppress vibration of a structure, and that can effectively suppress the vibration by easy adjustment when the characteristic of a generated vibration is different.

16 Claims, 7 Drawing Sheets

(51) Int. Cl.
*B23Q 1/01* (2006.01)
*B23Q 11/00* (2006.01)
*F16F 15/02* (2006.01)

(58) Field of Classification Search
USPC ................................................ 188/379, 380
See application file for complete search history.

(56) References Cited

U.S. PATENT DOCUMENTS

| | | | | | |
|---|---|---|---|---|---|
| 3,668,939 | A | * | 6/1972 | Schrader | B06B 3/00 |
| | | | | | 74/61 |
| 4,736,701 | A | * | 4/1988 | Kondo | B63B 27/04 |
| | | | | | 114/340 |
| 4,852,848 | A | * | 8/1989 | Kucera | F16F 7/104 |
| | | | | | 248/559 |
| 7,284,527 | B2 | * | 10/2007 | Herrera | F16F 7/104 |
| | | | | | 123/195 C |
| 7,690,872 | B2 | | 4/2010 | Hashimoto et al. | |
| 9,500,247 | B2 | * | 11/2016 | Song | F16F 7/104 |
| 2004/0200682 | A1 | * | 10/2004 | Herrera | F16F 7/104 |
| | | | | | 188/380 |
| 2006/0169557 | A1 | * | 8/2006 | Goetchius | F16F 9/306 |
| | | | | | 188/378 |
| 2008/0308368 | A1 | * | 12/2008 | Gustavsson | F16F 7/104 |
| | | | | | 188/380 |
| 2010/0032256 | A1 | * | 2/2010 | Wieser | B60N 2/544 |
| | | | | | 188/380 |
| 2010/0314210 | A1 | * | 12/2010 | Amano | F16F 7/08 |
| | | | | | 188/381 |
| 2015/0102542 | A1 | * | 4/2015 | Dos Santos | F04B 39/0027 |
| | | | | | 267/140.4 |
| 2015/0202728 | A1 | | 7/2015 | Ebihara | |

FOREIGN PATENT DOCUMENTS

| | | |
|---|---|---|
| EP | 3017911 A1 | 5/2016 |
| JP | 50129976 U | 10/1975 |
| JP | 60188244 U | 12/1985 |
| JP | 3123648 U | 12/1991 |
| JP | 200548791 A | 2/2005 |
| JP | 2007276015 A | 10/2007 |
| JP | 200818510 A | 1/2008 |
| TW | M442899 U1 | 12/2012 |

* cited by examiner

VIBRATION SUPPRESSION DEVICE, MACHINE TOOL, AND VIBRATION SUPPRESSION METHOD

CROSS-REFERENCE TO RELATED APPLICATION

This application is the United States national phase of International Application No. PCT/JP2017/045890 filed Dec. 21, 2017, and claims priority to Japanese Patent Application No. 2016-251401 filed Dec. 26, 2016, the disclosures of which are hereby incorporated by reference in their entirety.

TECHNICAL FIELD

The present invention relates to a device for suppressing vibration of a structure, and in particular, to a vibration suppression device that suppresses chatter vibration generated when a machine tool performs machining on a workpiece, a machine tool including the vibration suppression device, and a vibration suppression method using the vibration suppression device.

BACKGROUND ART

In a machine tool that performs machining by rotating a tool or a workpiece, chatter vibration generated during machining of the workpiece may reduce accuracy of the machining of the workpiece. To address this problem, vibration suppression devices to be attached to a machine tool have been proposed. Among them, there has been proposed a vibration suppression device configured such that a damper having a weight sandwiched between a pair of rubber plate-shaped elastic members is fixed to the substantial center of support shafts extending in the vibration direction.

CITATION LIST

Patent Literature

Patent Literature 1: JP 2007-276015 A

SUMMARY OF INVENTION

Technical Problem

In the vibration suppression device described in Patent Literature 1, chatter vibration generated in the machine tool is transmitted from the support shafts to the weight through the elastic members. At this time, since the weight is less likely to move because of its large inertia, the vibration is absorbed by the weight. Hence, chatter vibration can be suppressed.

However, the frequency of chatter vibration generated in the machine tool may differ depending on the individual machine tool, or may differ depending on the tool attached to the rotating spindle. In order to appropriately suppress chatter vibration according to each case, the elastic member needs to be replaced with an elastic member having a different thickness or an elastic member made of a material having a different elastic coefficient each time.

In order to achieve this with the vibration suppression device described in Patent Literature 1, the elastic member needs to be replaced by disassembling the vibration suppression device. For this reason, replacement requires a lot of labors and time, and also requires preparation of elastic members of various thicknesses (or materials). Hence, the replacement is difficult to achieve in reality.

The present invention has been made in view of the above problems, and aims to provide a vibration suppression device that can effectively suppress vibration of a structure such as a machine tool, and that can effectively suppress the vibration by easy adjustment when the characteristic of a generated vibration is different. The invention also aims to provide a machine tool including the vibration suppression device, and a vibration suppression method using the vibration suppression device.

Solution to Problem

In order to solve the above problems, a vibration suppression device of a structure according to an aspect of the present invention includes a flexible member having a first position fixed to the structure to be a fixed end of a cantilever and a second position on a free end side, and a weight attached to the flexible member in the second position, and the vibration suppression device has an adjustment mechanism for changing a distance between the first position and the second position.

A machine tool according to an aspect of the present invention is a machine tool to which the above-described vibration suppression device is attached, in which the structure is a saddle, a column, or a tool stand of the machine tool.

A vibration suppression method according to an aspect of the present invention is a method of suppressing vibration of the structure by use of the above-described vibration suppression device, in which the distance between the first position and the second position is changed such that a phase of vibration of the structure and a phase of vibration of the vibration suppression device are in opposite phase.

Advantageous Effects of Invention

According to the above aspects, it is possible to provide a vibration suppression device that can effectively suppress vibration of a structure such as a machine tool, and that can effectively suppress the vibration by easy adjustment when the characteristic of a generated vibration is different. It is also possible to provide a machine tool including the vibration suppression device, and a vibration suppression method using the vibration suppression device.

DESCRIPTION OF EMBODIMENTS

Hereinafter, a vibration suppression device according to an embodiment of the present invention, a structure to which the vibration suppression device is attached, and a vibration suppression method using the vibration suppression device will be described with reference to the drawings.

In the following description, as an example of a structure, a case where a vibration suppression device is attached to a saddle of a machine tool will be described. Further, members having the same function are denoted by the same reference numerals in the drawings.

(Description of Machine Tool to which Vibration Suppression Device is Attached)

Figure 1:
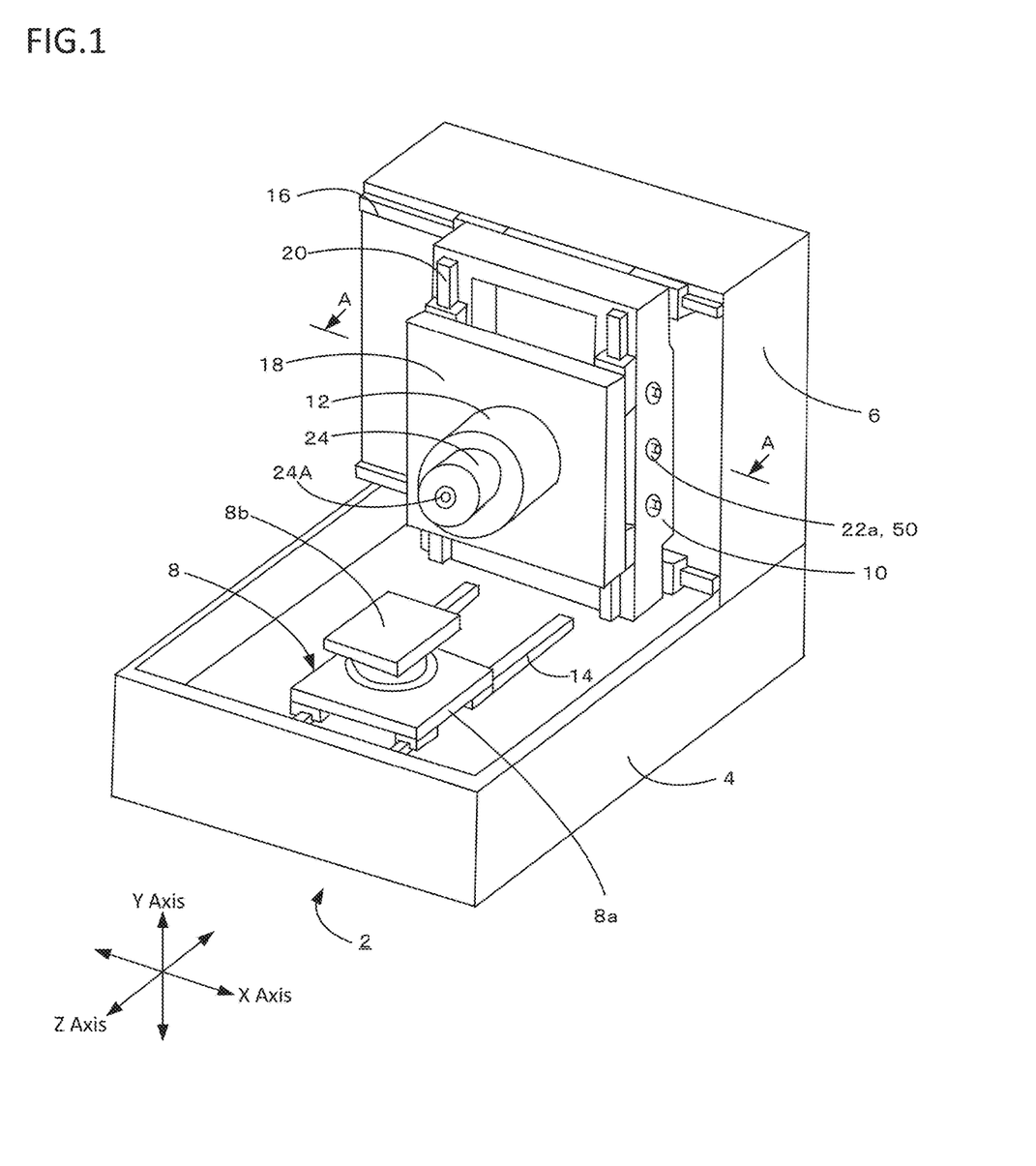
FIG. 1 is a perspective view schematically showing a machine tool to which a vibration suppression device according to an embodiment of the present invention is attached.

First, an outline of an example of a machine tool 2 to which a vibration suppression device 50 is attached will be described with reference to FIG. 1. FIG. 1 is a perspective view schematically showing the machine tool 2 to which the vibration suppression device 50 according to an embodiment of the present invention is attached.

The machine tool 2 of the embodiment is a horizontal machining center. It is noted, however, that the invention is not limited thereto. For example, the vibration suppression device 2 may be attached to a vertical machining center or a lathe-type machine tool in which the workpiece side rotates, and a similar vibration suppression effect can be obtained. Furthermore, the vibration suppression device 50 may be attached to any other device, as long as it is a device that generates chatter vibration during operation and needs to suppress the chatter vibration.

A bed 4 which is a base of the machine tool 2 has a rectangular shape in plan view. In a rear end portion of the bed 4, a gate-shaped column 6 is disposed and fixed in an upright state so as to form an L-shaped side shape together with the bed 4. A machining table 8 is disposed on the bed 4 and on the front side of the column 6 so as to be movable in the Z-axis (front-rear) direction. A saddle 10 is disposed on a front surface of the column 6 so as to be movable in the X-axis (right-left) direction, and a spindle head 12 is disposed on the saddle 10 so as to be movable in the Y-axis (up-down) direction.

In the embodiment, the saddle 10 is a structure in which the vibration needs to be suppressed, and the vibration suppression device 50 is attached to the saddle 10.

The above-described machining table 8 has a support base 8a and a workpiece mounting table 8b disposed on the support base 8a. The support base 8a is supported so as to be movable in the Z-axis direction by a right and left pair of guide rails 14, 14 disposed on the bed 4.

The above-described saddle 10 is formed in a rectangular frame shape, and is supported so as to be movable in the X-axis direction by an upper and lower pair of guide rails 16, 16 disposed in upper and lower end portions of the column 6.

The above-described spindle head 12 is fixed to a rectangular spindle base 18 with its axis oriented in the Z-axis direction. The spindle base 18 is supported so as to be movable in the Y-axis direction by a right and left pair of guide rails 20, 20 disposed on right and left vertical side portions of the saddle 10.

The spindle head 12 is generally supported such that a front half portion is positioned in front of the spindle base 18 and a rear half portion is positioned behind the spindle base 18, and the rear half portion is positioned within openings of the saddle 10 and the column 6.

The spindle head 12 has a cylindrical shape. A spindle 24 is provided and inserted in the spindle head 12. The spindle 24 is rotatably supported by the spindle head 12 through multiple bearings. Additionally, a spindle motor is incorporated in the spindle head 12, and the spindle 24 is rotationally driven by the spindle motor. A tool holder for supporting a rotary tool is detachably mounted on a front end portion 24a of the spindle 24. The attachment/detachment mechanism enables replacement and mounting of the tools.

With the above-described configuration, a workpiece placed on the machining table 8 can be cut with a rotating tool. The cutting resistance and the like occurring at this time causes chatter vibration. Chatter vibration means vibration that occurs continuously between a tool and a workpiece. In the embodiment, chatter vibration is small in the vertical direction (Y direction) due to the weight of the machine tool 2 fixed to the floor, and the vibration mainly occurs in the horizontal direction (X and Z directions). Chatter vibration generated around the tool is transmitted to the saddle 10 through the spindle head 12, the spindle base 18 and the guide rails 20.

(Description of Saddle to which Vibration Suppression Device is Attached)

Figure 2:
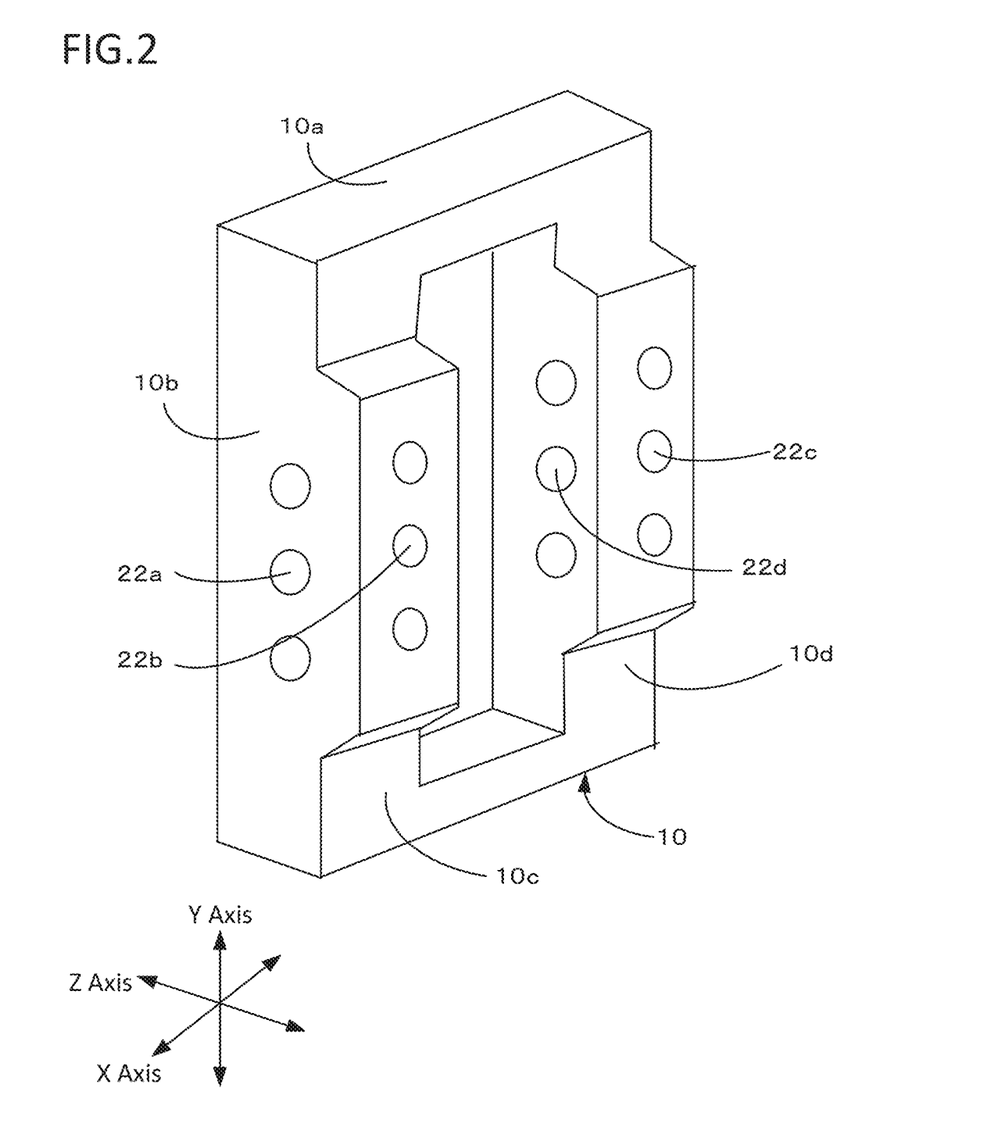
FIG. 2 is a side view showing a view on arrow A-A of FIG. 1, and is a perspective view schematically showing, from the back side, a saddle of the machine tool to which the vibration suppression device according to an embodiment of the present invention is attached.

Next, an outline of the saddle 10 to which the vibration suppression device 50 is actually attached will be described with reference to FIG. 2. FIG. 2 is a side view showing a view on arrow A-A of FIG. 1, and is a perspective view schematically showing, from the back side, the saddle 10 of the machine tool 2 to which the vibration suppression device 50 according to an embodiment of the present invention is attached. FIG. 2 shows the saddle 10 in a state where the vibration suppression device 50 is not attached.

The saddle 10 according to the embodiment includes upper, lower, right, and left frame portions 10a to 10d connected to one another, and the center surrounded by the frame portions 10a to 10d is an opening. Each of the frame portions 10a to 10d is provided with an opening (not shown) for weight reduction as long as sufficient strength can be maintained. In particular, openings 22a to 22d, each including three openings in the up-down direction, are provided in the right and left frame portions 10b, 10d, and the vibration suppression device 50 is attached to the inside of each of the openings 22a to 22d. In the embodiment, a vibration suppression device group in which three vibration suppression devices 50 are arranged adjacent to each other in the vertical direction is provided in four separate parts, and total 12 vibration suppression devices 50 are attached to the saddle 10.

In order to effectively suppress chatter vibration generated by machining of a workpiece, it is preferable that the vibration suppression device 50 be attached to a member that has few members interposed between the member and the tool that is the vibration source, and has enough rigidity to sufficiently exhibit the vibration suppression effect. From this point of view, the saddle 10 is preferable as a structure to which the vibration suppression device 50 is attached.

(Description of Vibration Suppression Device According to First Embodiment of Present Invention)

Figure 3:
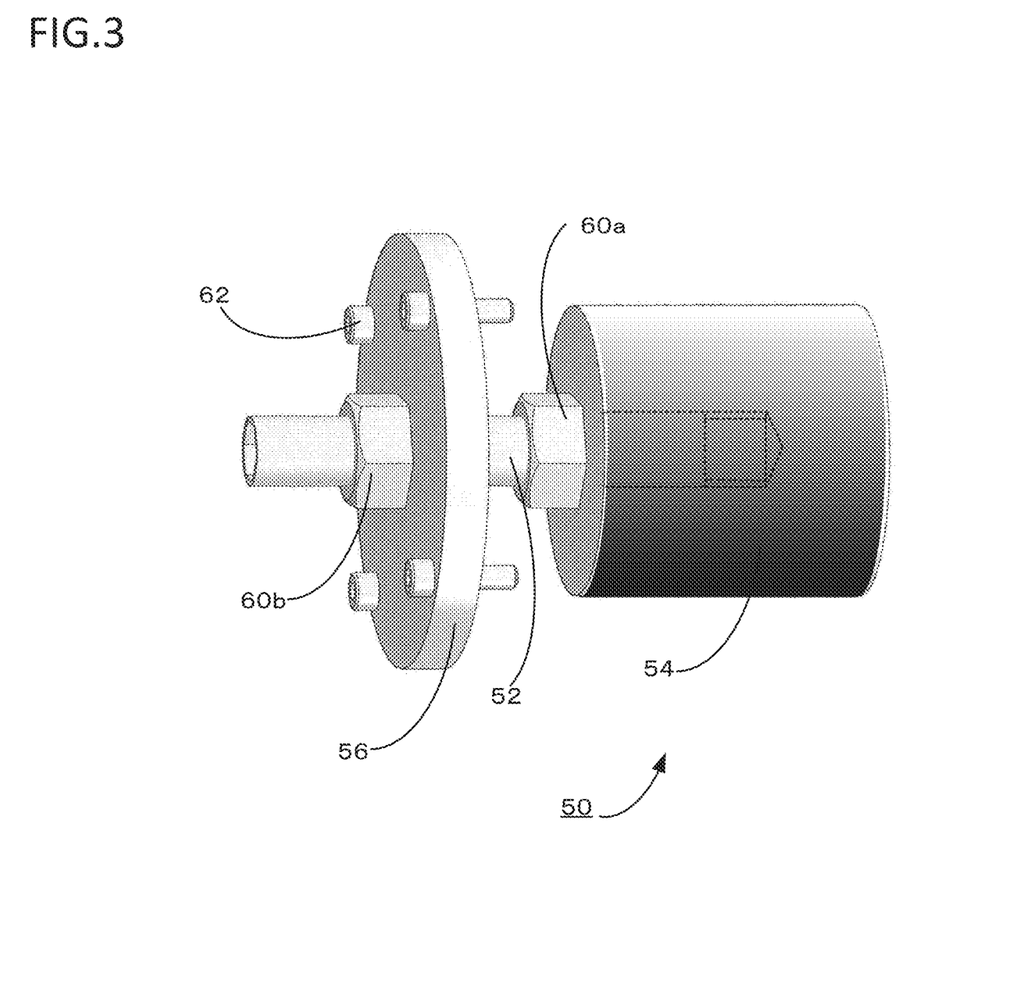
FIG. 3 is a perspective view schematically showing a vibration suppression device according to a first embodiment of the present invention.
Figure 4:
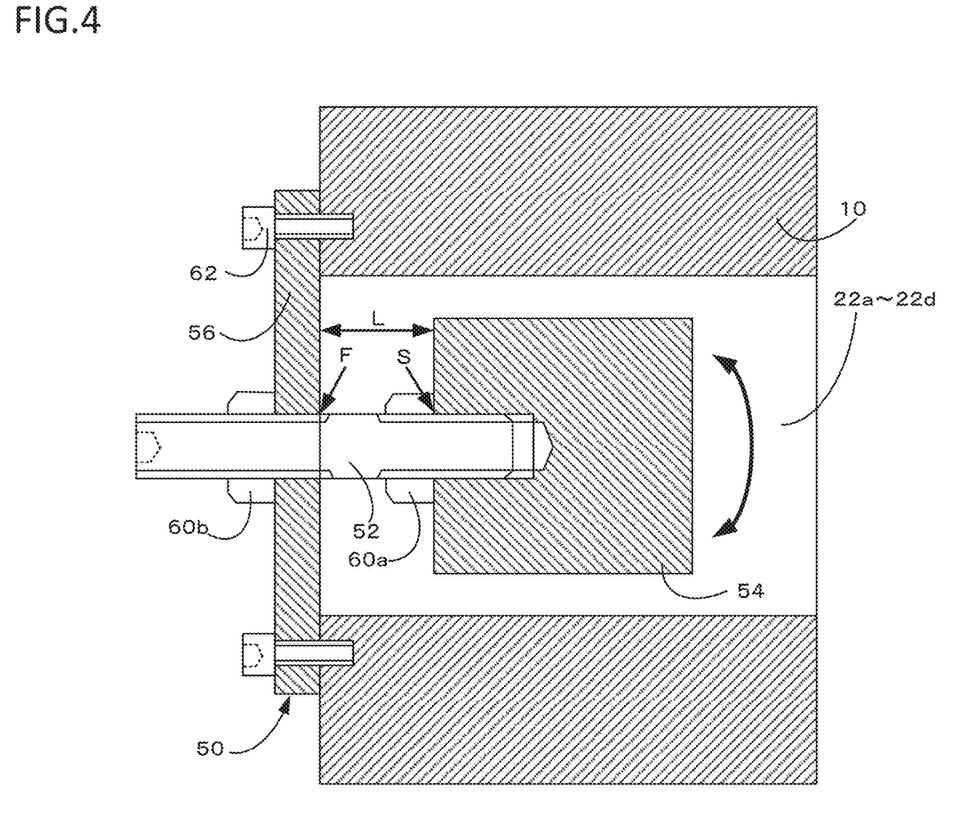
FIG. 4 is a side cross-sectional view schematically showing the vibration suppression device according to the first embodiment of the present invention which is attached to a saddle.

Next, the vibration suppression device 50 according to a first embodiment of the present invention attached to a structure such as the saddle 10 will be described with reference to FIGS. 3 and 4. FIG. 3 is a perspective view schematically showing the vibration suppression device 50 according to the first embodiment of the present invention. FIG. 4 is a side cross-sectional view schematically showing the vibration suppression device 50 according to the first embodiment of the present invention which is attached to the saddle 10.

The vibration suppression device 50 includes: a flexible member 52 having a first position F fixed to the saddle 10 which is a structure to be the fixed end of a cantilever, and a second position S which is the free end side; and a weight 54 attached to the flexible member 52 in the second position S. The flexible member 52 is attached to a base plate 56 in the first position F, and the base plate 56 is fixed to the saddle 10. The weight 54 is disposed in any of the internal spaces 22a to 22d provided inside the saddle 10 so as not to come into contact with the inner wall thereof. It is preferable that a sufficient clearance be ensured between the outline of the weight 54 and the inner wall of the internal spaces 22a to 22d, so that the weight 54 does not come into contact with the inner wall of the internal spaces 22a to 22d due to flexural oscillation.

The flexible member 52 of the embodiment is in the form of a shaft having a circular cross section, and is externally threaded in a region on the right side in FIG. 4. The weight 54 has a cylindrical shape, and an internally threaded hole is provided along the central axis in an end portion on the left side in FIG. 4. The male screw portion of the flexible member 52 is screwed into the screw hole, whereby the flexible member 52 and the weight 54 are fixed to each other. Furthermore, a nut 60a is screwed onto the male screw portion of the flexible member 52, and the nut 60a is tightened so as to press an end surface of the weight 54 on the left side in FIG. 4. This forms a locking mechanism similar to a double nut and defines the second position S of the flexible member 52.

The flexible member 52 is also externally threaded in a region on the left side in FIG. 4. It is noted that the external thread may be provided so as to be continuous with the aforementioned external thread in the region on the right side in FIG. 4. The base plate 56 has a disk shape, and is provided with an internally threaded through hole at its center. The external thread portion of the flexible member 52 is screwed into the screw hole, whereby the flexible member 52 and the base plate 56 are fixed to each other. Furthermore, a nut 60b is screwed onto the flexible member 52, and the nut 60b is tightened so as to press a surface of the base plate 56 on the left side in FIG. 4. This forms a locking mechanism similar to a double nut and defines the first position F of the flexible member 52. At this time, the flexible member 52 is fixed in such a manner to protrude from both sides of the base plate 56.

Evenly spaced four through holes are provided in a peripheral portion of the base plate 56. Screw holes are provided around the internal spaces 22a to 22d of the saddle 10 at positions corresponding to the through holes of the base plate 56. The base plate 56 is fixed to the saddle 10 by screwing bolts 62 through the through holes of the base plate 56 and into the screw holes provided on the saddle 10 side.

Since the flexible member 52 is screwed into the screw hole penetrating the center of the base plate 56, the relative positions of the flexible member 52 and the base plate 56 (or protrusion amount) can be changed by rotating the flexible member 52, whereby a distance L between the first position F and the second position S can be changed. At this time, even in a state where the vibration suppression device 50 is attached to the saddle 10 so that the weight 54 is positioned inside the saddle 10, the flexible member 52 can be rotated by removing the nut 60b from the outside of the saddle 10. Hence, the distance L can be changed easily without removing the vibration suppression device 50 from the saddle 10.

The flexible member 52, the weight 54, and the base plate 56 provided in the vibration suppression device 50 are formed of a metal material such as carbon steel, stainless steel, aluminum, copper, or the like. The dimensions of the weight 54 are exemplified by an outer diameter of 30 to 100 mm and a length of 30 to 100 mm, the dimensions of the flexible member 52 are exemplified by an outer diameter of 10 to 130 mm and a length of 20 to 100 mm, and the outline of the base plate 56 may be 50 to 150 mm, for example. It is noted, however, that the invention is not limited thereto.

<Description of Vibration of Flexible Member to which Weight is Attached>

The vibration transmitted to the saddle 10 is transmitted to the flexible member 52 at the first position F through the base plate 56. Since the first position F is the fixed end of the cantilever and the weight 54 is attached to the free end of the cantilever, the transmitted vibrational energy causes the flexible member 52 to which the weight 54 is attached to vibrate and bend in both directions about the first position F, as indicated by an arrow in FIG. 4.

Since the flexible member 52 of the embodiment is in the form of a shaft having a circular cross section, the flexible member 52 vibrates and bends in any direction according to the mounting direction of the saddle 10. It is noted that since chatter vibration mainly occurs in the horizontal direction (X and Z axis directions) as described earlier, the flexible member 52 to which the weight 54 is attached also vibrates mainly in the horizontal direction (X and Z axis directions).

For example, in the vibration suppression device 50 (see FIG. 2) attached to the opening 22a or 22d, the axial direction of the flexible member 52 to which the weight 54 is attached is the X-axis direction. Hence, the flexible member 52 to which the weight 54 is attached mainly vibrates in the Z-axis direction. On the other hand, in the vibration suppression device 50 (see FIG. 2) attached to the opening 22b or 22c, the axial direction of the flexible member 52 to which the weight 54 is attached is the Z axis direction. Hence, the flexible member 52 to which the weight 54 is attached mainly vibrates in the X-axis direction.

<Description of Method of Changing Distance L>

The method of changing the distance L will be described in further detail as follows.

Since the base plate 56 is fixed to the saddle 10 by the bolts 62 with the weights 54 positioned in the internal spaces 22a to 22d of the saddle 10, an adjusting person can easily access an outer surface (surface on left side in FIG. 4) of the base plate 56, a portion of the flexible member 52 protruding outward from the base plate 56, and the nut 60b.

First, the nut 60b tightened so as to press the base plate 56 is loosened and removed from the flexible member 52. This allows the flexible member 52 to be movable with respect to the base plate 56. Then, a hexagonal wrench key can be inserted into a hexagon socket provided at the left end of the flexible member 52 in FIG. 4, to turn the flexible member 52 clockwise or counterclockwise. Since the flexible member 52 is screwed with the base plate 56, the distance L between the first position F and the second position S can be changed by turning the flexible member 54. When the protrusion amount of the flexible member 52 toward the outer side from the base plate 56 increases, the distance L decreases, and when the protrusion amount decreases, the distance L increases.

The distance L between the first position F and the second position S can be calculated by measuring the protrusion amount of the flexible member 54 toward the outer side from the base plate 56. Hence, in this adjustment mechanism, the distance L can be easily and accurately changed without removing the vibration suppression device 50 from the saddle 10.

<Description of Method of Adjusting Phase of Vibration>

As will be described later with reference to FIG. 6, when the phase of vibration of the flexible member 52 to which the weight 54 is attached and the phase of vibration of the saddle 10 are opposite or almost opposite, the vibrational energies of the phases cancel each other out. As a result, chatter vibration of the saddle 10 can be suppressed effectively.

In addition, the phase of the generated chatter vibration may differ depending on the individual machine tool, or may differ depending on the attached tool.

Hence, it is necessary to change the phase of vibration of the flexible member 52 to which the weight 54 is attached, in accordance with the change in the phase of the generated chatter vibration. In order to change the phase of vibration of the flexible member 52, it is necessary to change the distance L between the first position F and the second position S. Even in such a case, in the embodiment, since the distance L can be changed easily without removing the vibration suppression device 50 from the saddle 10, an optimum vibration suppression effect can always be obtained.

(Description of Vibration Suppression Device according to Second Embodiment of Present Invention)

Figure 5A:
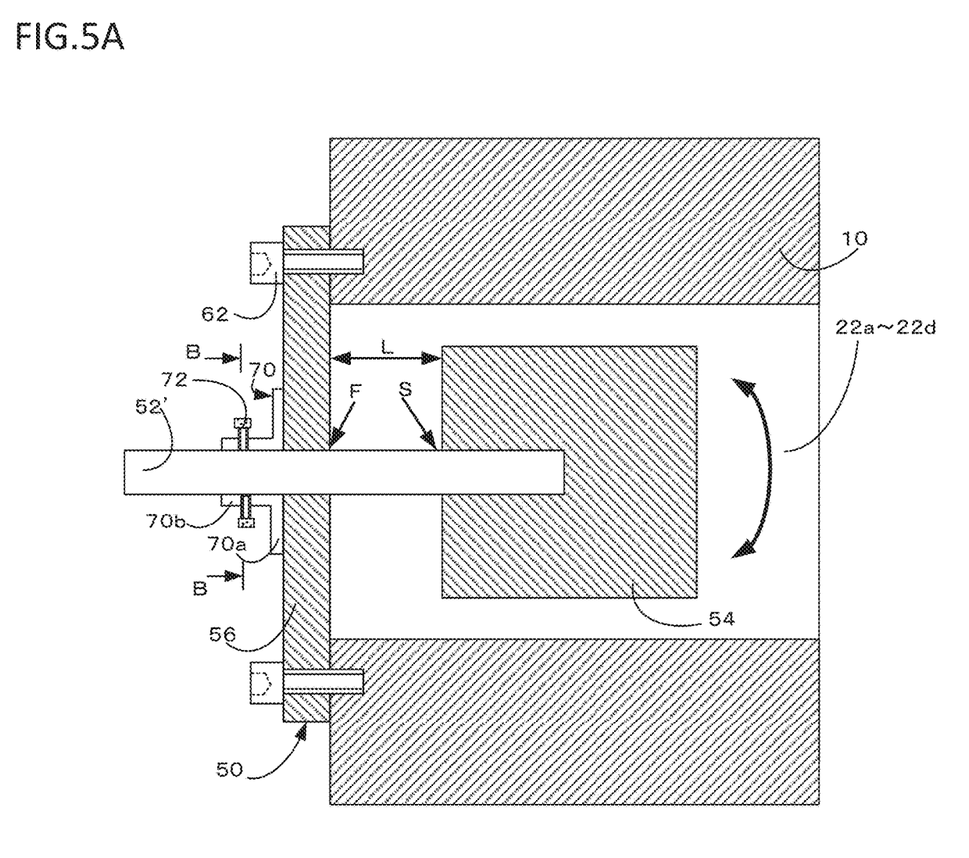
FIG. 5A is a side cross-sectional view schematically showing the vibration suppression device according to the second embodiment of the present invention.
Figure 5B:
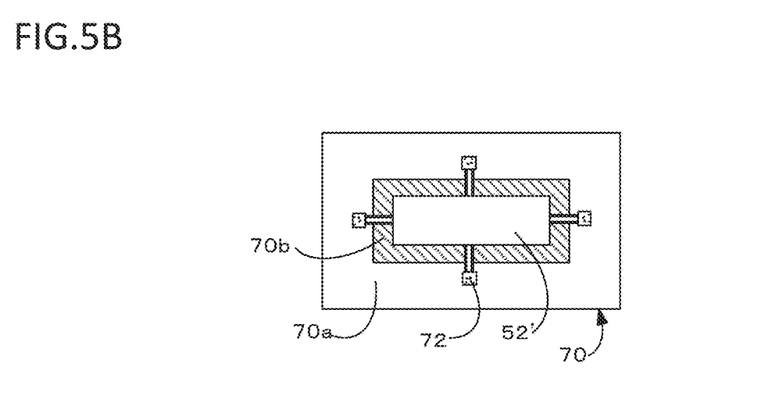
FIG. 5B is a side cross-sectional view showing a B-B section of FIG. 5A.

Next, a vibration suppression device 50' according to a second embodiment of the present invention will be described with reference to FIG. 5. FIG. 5A is a side cross-sectional view schematically showing the vibration suppression device according to the second embodiment of the present invention. FIG. 5B is a side cross-sectional view showing a B-B section of FIG. 5A.

The vibration suppression device 50' according to the second embodiment differs from the vibration suppression device 50 according to the first embodiment mainly in the following points.

The flexible member 52 according to the first embodiment is in the form of a shaft having a circular cross section, whereas a flexible member 52' according to the second embodiment is in the form of a flat plate having a flat rectangular cross section as shown in FIG. 5B. Accordingly, a weight 54 is provided with a hole having a shape corresponding to the outline of the flexible member 52' and slightly smaller than the outer dimension of the flexible member 52'. The flexible member 52' is interference fit with the hole of the flexible member 52'. If necessary, the components may be fit more firmly by setscrews or spot welding.

A base plate 56 is provided with a through hole having a shape corresponding to the outline of the flexible member 52' and slightly larger than the outer dimension of the flexible member 52'. The flexible member 52' is inserted into the through hole of the base plate 56 so as to protrude from both sides of the base plate 56.

A clamp mechanism 70 configured with a base portion 70a and a clamp portion 70b that rises in a central region of the base portion 70a is attached to a surface of the base plate 56 on the left side in FIG. 5. The clamp portion 70b is provided with a through hole having a shape corresponding to the outline of the flexible member 52' and slightly larger than the outer dimension of the flexible member 52'. As a result, the flexible member 52' inserted into the through hole of the clamp portion 70b is movable relative to the base plate 56 to which the clamp mechanism 70 is attached. Hence, a distance L between a first position F and a second position S can be changed easily.

A setscrew 72 is inserted and screwed into a screw hole penetrating the center of each of four side surfaces of the clamp portion 70b, and after the optimum distance L is determined, the setscrews 72 can be tightened to fix the flexible member 52' to the base plate 56. Further, when it is necessary to re-adjust the distance L, the re-adjustment can be easily performed by loosening the setscrews 72.

As indicated by an arrow in FIG. 5A, the flat flexible member 52' mainly vibrates along the short side direction and does not vibrate much along the orthogonal long side direction. However, if the flexible member 52' is attached to the saddle 10 such that the long side direction of the flexible member 52' coincides with the Y axis direction where vibration hardly occurs, chatter vibration in the X axis and Z axis directions can be suppressed effectively as in the case of the first embodiment.

The other points are basically similar to those in the first embodiment, and further description is omitted.

(Description of Demonstration Example of Vibration Suppression Effect by Vibration Suppression Device)

Next, a demonstration example of the vibration suppression effect by the vibration suppression device 50 according to the first embodiment described above will be described with reference to FIGS. 6A to 6C and 7. FIG. 6A shows graphs of a waveform of vibration for describing the vibration suppression effect by one vibration suppression device, specifically shows a waveform before adjustment. FIG. 6B specifically shows a waveform after adjustment. FIG. 6C specifically shows a graph showing comparison of waveforms before and after adjustment. FIG. 7 is a graph showing a waveform of vibration for describing a vibration suppression effect in a case of adjusting each of multiple vibration suppression devices 50 disposed adjacent to one another.

First, a vibration suppression effect by one vibration suppression device 50 will be described with reference to the graph of FIGS. 6A to 6C. The horizontal axis of the graph represents the frequency, and the vertical axis represents the relative magnitude of the vibration.

Figure 6A:
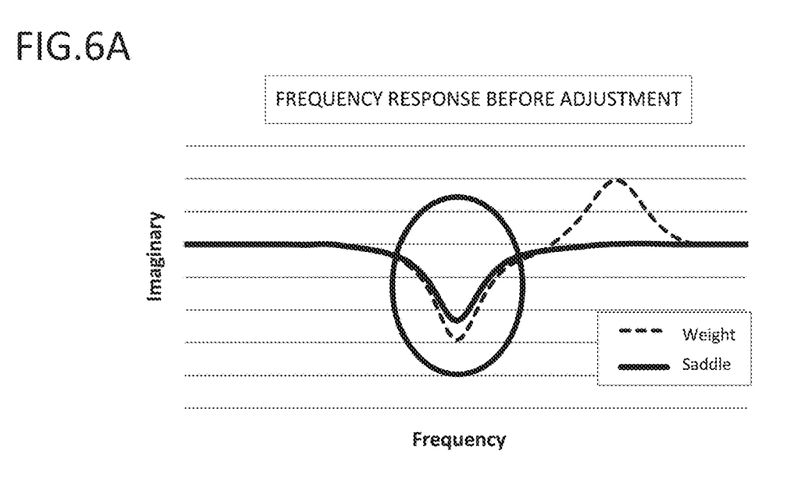
FIG. 6A shows graphs of a waveform of vibration for describing the vibration suppression effect by one vibration suppression device, specifically shows a waveform before adjustment
Figure 6B:
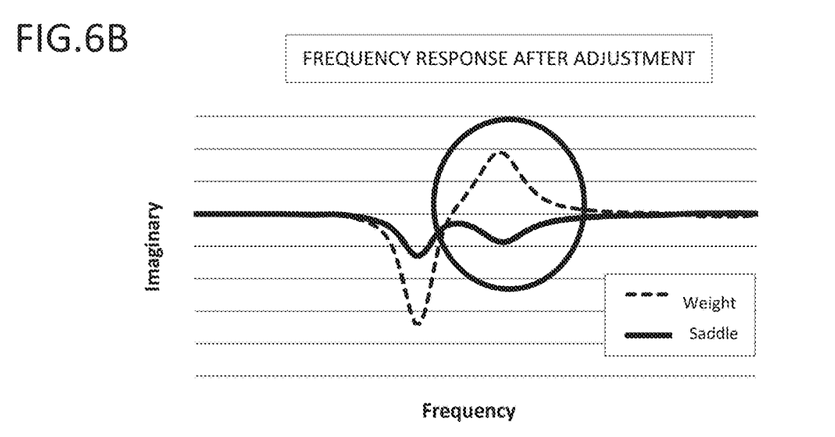
FIG. 6B shows graphs of a waveform of vibration for describing the vibration suppression effect by one vibration suppression device, specifically shows a waveform after adjustment.

Further, in FIGS. 6A and 6B, the solid line graph indicates the vibration of the saddle 10 which is a structure, and the broken line graph indicates the vibration of the vibration suppression device 50 (specifically, flexible member 52 to which weight is attached). Meanwhile, in FIG. 6C, the solid line graph indicates the vibration of the saddle 10 after adjustment, and the broken line graph indicates the vibration of the saddle 10 before adjustment.

Before the adjustment as shown in FIG. 6A, the phase of vibration of the saddle 10 and the phase of the vibration suppression device 50 are in phase (refer to area surrounded by thick line), and the vibration suppression effect does not occur. On the other hand, after the adjustment as shown in FIG. 6B, since the phase of vibration of the saddle 10 and the phase of the vibration suppression device 50 are opposite (refer to area surrounded by thick line), the vibration suppression effect occurs. In FIG. 6C where the waveforms of the saddle 10 before and after adjustment are compared to clarify the difference therebetween, the waveform before adjustment having one high peak is cancelled out by the vibrational energy of the vibration suppression device of opposite phase and is changed into a waveform having two peaks. This indicates that the peak height has dropped by about 50%.

Thus, it has been confirmed that one vibration suppression device 50 has a large vibration suppression effect.

Next, a vibration suppression effect in a case of adjusting each of multiple (six) vibration suppression devices 50 arranged adjacent to each other will be described with reference to the graph of FIG. 7. The horizontal axis of the graph represents the frequency, and the vertical axis represents the relative magnitude of the vibration. Further, the solid line graph indicates the vibration of the saddle 10 after adjustment, and the broken line graph indicates the vibration of the saddle 10 before adjustment. The graph of FIG. 7 is based on measurement data acquired in a state where six vibration suppression devices 50 are attached to the back side of the saddle 10.

As is apparent from FIG. 7, the waveform before adjustment having one high peak is cancelled out by the vibrational energy of the multiple (six) vibration suppression devices of opposite phase and is changed into a trapezoidal waveform in which the difference between adjacent peaks is reduced. This indicates that the peak height has dropped by about 60%. That is, as compared to the case where one vibration suppression device is used, a vibration suppression effect in a wider frequency band has been confirmed.

As described above, the vibration suppression device 50, 50' according to the embodiments of the present invention includes the flexible member 52, 52' having the first position F fixed to a structure (e.g., saddle 10) to be the fixed end of a cantilever and the second position S which is the free end side, and the weight 54 attached to the flexible member 52, 52' in the second position S, and have the adjustment mechanism for changing the distance L between the first position F and the second position S. Hence, the vibration of the structure (e.g., saddle 10) can be suppressed effectively, and the vibration can be suppressed effectively by easy adjustment when the characteristic of a generated vibration is different.

Furthermore, since the weight 54 is provided inside the structure (e.g., saddle 10), a stable vibration suppression effect can be obtained without the risk of interference with an object outside the structure. Furthermore, since the weight 54 is disposed in the space provided inside the structure (e.g., saddle 10) so as not to come into contact with the structure, a stable vibration suppression effect can always be obtained.

While the flexible member 52, 52' has a shaft shape or a flat plate shape in the above embodiments, the invention is not limited thereto. The flexible member 52, 52' may have a polygonal column shape or any other shape, as long as it is a shape that vibrates and bends symmetrically about the fixed end.

In addition, the shape of the weight 54 does not always have to be cylindrical, and a weight having a shape such as a sphere or a polygonal column may be adopted, for example. The shape of the base plate 56 does not always have to be disk-like either, and a flat plate having any planar shape may be adopted.

The flexible member 52, 52' is attached to the base plate 56 at the first position F, and the base plate 56 is fixed to the structure (e.g., saddle 10). Hence, the first position F fixed to the structure to be the fixed end of the cantilever can be defined reliably.

Furthermore, a through hole is formed in the base plate 56, and the flexible member 52, 52' is inserted into the through hole so as to protrude from both sides of the base plate 54. The distance L between the first position F and the second position S can be changed by changing relative positions of the flexible member 52 and the base plate 56.

As a result, it is possible to achieve an adjustment mechanism that can easily change the distance with a simple structure. In addition, even if the vibration suppression device 50, 50' is attached to the structure so that the weight 54 is positioned inside the structure (e.g., saddle 10), since the flexible member 52, 52' is located outside the structure, the distance L can be changed easily without removing the vibration suppression device 50 from the structure.

Figure 6C:
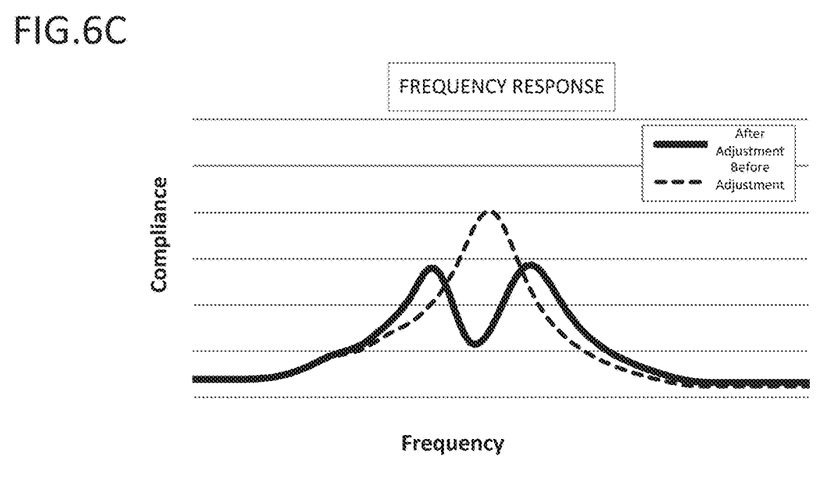
FIG. 6C shows graphs of a waveform of vibration for describing the vibration suppression effect by one vibration suppression device, specifically shows a graph showing comparison of waveforms before and after adjustment.
Figure 7:
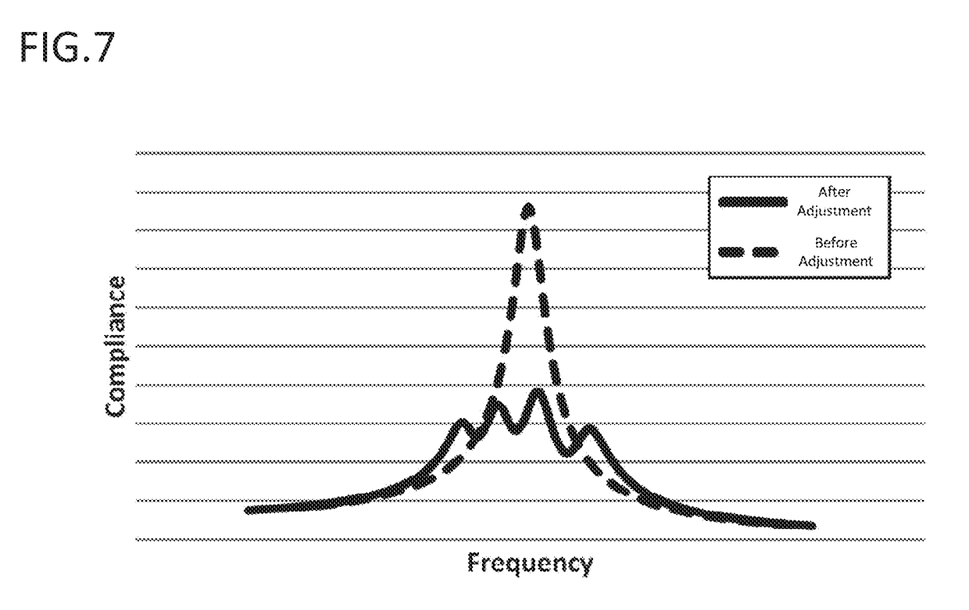
FIG. 7 is a graph showing a waveform of vibration for describing a vibration suppression effect in a case of adjusting each of multiple vibration suppression devices disposed adjacent to one another.

Additionally, as is apparent from the graph of FIGS. 6A to 6C, by changing the distance L between the first position F and the second position S such that the phase of vibration of the flexible member 52, 52' to which the weight 54 is attached is opposite to the phase of vibration of the structure (e.g., saddle 10), the vibration of the structure can be suppressed effectively.

Furthermore, as is apparent from the graph of FIG. 7, by bringing multiple vibration suppression devices 50, 50' close to one another and fixing them to a structure (e.g., saddle 10), and changing the distance L between the first position F and the second position S for each vibration suppression device 50, 50', the vibration of the structure can be suppressed effectively in a wider frequency band of vibration.

While the structure is the saddle 10 of the machine tool 2 in the above embodiments, the invention is not limited thereto. For example, since the gate-shaped column 6 supporting the saddle 10 through the guide rails 16, 16 also has sufficient rigidity, the vibration suppression device 50, 50' may be attached to the column 6 to suppress the vibration of the machine tool 2.

Moreover, in the case of a lathe-type machine tool that rotates a workpiece, chatter Z vibration is generated from a tool mounted on a tool stand. Hence, the vibration of the machine tool 2 can be suppressed effectively by attaching the vibration suppression device 50, 50' to the tool stand.

While the embodiments and modes of the present invention have been described, the disclosed contents may be varied in details of the configuration, and the combination and order of the elements in the embodiments and modes may be varied, for example, without departing from the claimed scope and spirit of the present invention.

REFERENCE SIGNS LIST 2 machine tool
4 bed
6 column
8 machining table
8a support base
8b workpiece mounting table
10 saddle 10a to d frame portion
12 spindle head
14 guide rail
16 guide rail
18 spindle base
20 guide rail
22a to d opening
24 spindle
24a spindle front end portion
50, 50' vibration suppression device
52 flexible member
54 weight
56 base plate
60a, 60b nut
62 bolt
70 clamp mechanism
70a base portion
70b clamp portion
72 bolt

The invention claimed is:

1. A vibration suppression device of a structure, the vibration suppression device comprising:
a flexible member having a first position fixed to the structure to be a fixed end of a cantilever and a second position on a free end side; and
a weight attached to the flexible member in the second position,
wherein the vibration suppression device has an adjustment mechanism for changing a distance between the first position and the second position,
wherein the flexible member is attached to a base plate in the first position, and the base plate is fixed to the structure, and
wherein a through hole is formed in the base plate, and the flexible member is inserted into the through hole so as to protrude from both sides of the base plate, and the distance between the first position and the second position is changed by changing relative positions of the flexible member and the base plate.

2. A machine tool to which the vibration suppression device according to claim 1 is attached,
wherein the structure is a saddle, a column, or a tool stand of the machine tool.

3. A method of suppressing vibration of the structure by use of the vibration suppression device according to claim 1,
wherein the distance between the first position and the second position is changed such that a phase of vibration of the flexible member to which the weight is attached is opposite to a phase of vibration of the structure.

4. The vibration suppression method according to claim 3, wherein a plurality of the vibration suppression devices are brought close to one another and fixed to the structure, and the distance between the first position and the second position is changed for each of the vibration suppression devices.

5. A vibration suppression device of a structure, the vibration suppression device comprising:
a flexible member having a first position fixed to the structure to be a fixed end of a cantilever and a second position on a free end side; and
a weight attached to the flexible member in the second position,
wherein the vibration suppression device has an adjustment mechanism for changing a distance between the first position and the second position,
wherein the weight is disposed in a space provided inside the structure so as not to come into contact with the structure,
wherein the flexible member is attached to a base plate in the first position, and the base plate is fixed to the structure, and
wherein a through hole is formed in the base plate, and the flexible member is inserted into the through hole so as to protrude from both sides of the base plate, and the distance between the first position and the second position is changed by changing relative positions of the flexible member and the base plate.

6. A machine tool to which the vibration suppression device according to claim 5 is attached,
wherein the structure is a saddle, a column, or a tool stand of the machine tool.

7. A method of suppressing vibration of the structure by use of the vibration suppression device according to claim 5,
wherein the distance between the first position and the second position is changed such that a phase of vibration of the flexible member to which the weight is attached is opposite to a phase of vibration of the structure.

8. The vibration suppression method according to claim 7, wherein a plurality of the vibration suppression devices are brought close to one another and fixed to the structure, and the distance between the first position and the second position is changed for each of the vibration suppression devices.

9. A vibration suppression device of a structure, the vibration suppression device comprising:
a flexible member having a first position fixed to the structure to be a fixed end of a cantilever and a second position on a free end side; and
a weight attached to the flexible member in the second position,
wherein the vibration suppression device has an adjustment mechanism for changing a distance between the first position and the second position,
wherein the flexible member has a shaft shape,
wherein the flexible member is attached to a base plate in the first position, and the base plate is fixed to the structure, and
wherein a through hole is formed in the base plate, and the flexible member is inserted into the through hole so as to protrude from both sides of the base plate, and the distance between the first position and the second position is changed by changing relative positions of the flexible member and the base plate.

10. A machine tool to which the vibration suppression device according to claim 9 is attached,
wherein the structure is a saddle, a column, or a tool stand of the machine tool.

11. A method of suppressing vibration of the structure by use of the vibration suppression device according to claim 9,
wherein the distance between the first position and the second position is changed such that a phase of vibration of the flexible member to which the weight is attached is opposite to a phase of vibration of the structure.

12. The vibration suppression method according to claim 11, wherein a plurality of the vibration suppression devices are brought close to one another and fixed to the structure, and the distance between the first position and the second position is changed for each of the vibration suppression devices.

13. A vibration suppression device of a structure, the vibration suppression device comprising:
- a flexible member having a first position fixed to the structure to be a fixed end of a cantilever and a second position on a free end side; and
- a weight attached to the flexible member in the second position,
- wherein the vibration suppression device has an adjustment mechanism for changing a distance between the first position and the second position,
- wherein the weight is disposed in a space provided inside the structure so as not to come into contact with the structure,
- wherein the flexible member has a shaft shape,
- wherein the flexible member is attached to a base plate in the first position, and the base plate is fixed to the structure, and
- wherein a through hole is formed in the base plate, and the flexible member is inserted into the through hole so as to protrude from both sides of the base plate, and the distance between the first position and the second position is changed by changing relative positions of the flexible member and the base plate.

14. A machine tool to which the vibration suppression device according to claim 13 is attached,
- wherein the structure is a saddle, a column, or a tool stand of the machine tool.

15. A method of suppressing vibration of the structure by use of the vibration suppression device according to claim 13,
- wherein the distance between the first position and the second position is changed such that a phase of vibration of the flexible member to which the weight is attached is opposite to a phase of vibration of the structure.

16. The vibration suppression method according to claim 15, wherein a plurality of the vibration suppression devices are brought close to one another and fixed to the structure, and the distance between the first position and the second position is changed for each of the vibration suppression devices.

* * * * *